INVENTOR.
CORNELIS VAN DER LELY

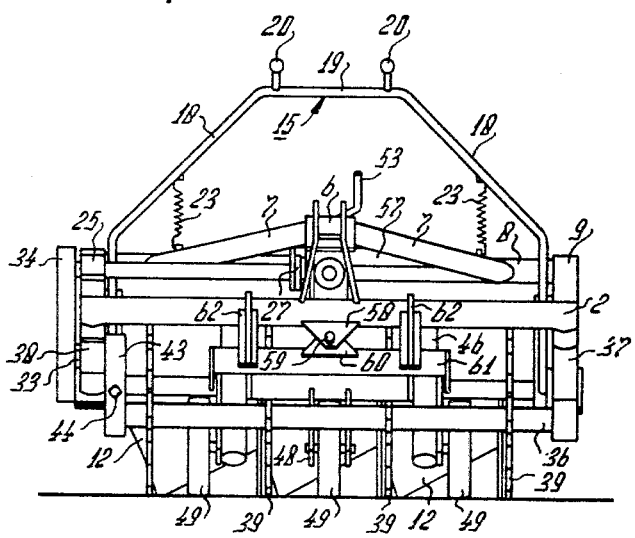

3,252,521
ROTARY CUTTERS AND PLOWS
Cornelis van der Lely, Zug, Switzerland, assignor to Patent Concern N.V., Willemstad, Curacao, Netherlands Antilles, a limited-liability company of the Netherlands Antilles
Filed June 26, 1964, Ser. No. 378,398
Claims priority, application Netherlands, July 12, 1963, 295,296
7 Claims. (Cl. 172—71)

The invention relates to a plow comprising a plurality of plow bodies.

In accordance with the invention the plow is provided with a plurality of substantially vertical, mechanically driven discs which are located in front of the plow bodies, viewed in the direction of travel.

According to a second aspect of the invention there is provided a plow comprising a plurality of plow bodies, in which the plow bodies operative on the same side are arranged so that, viewed in a direction transverse of the travelling direction, they are located substantially one behind the other.

Figure 1:
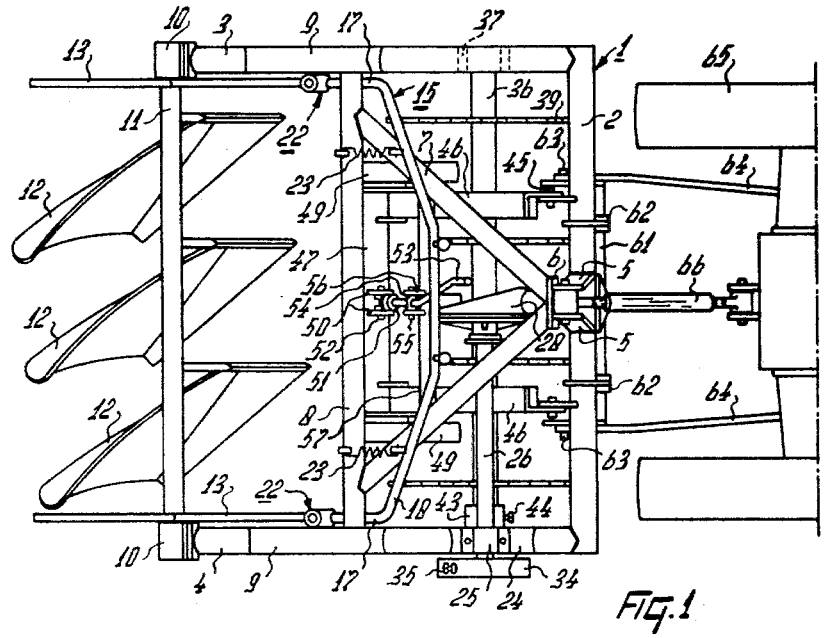
Figure 2:
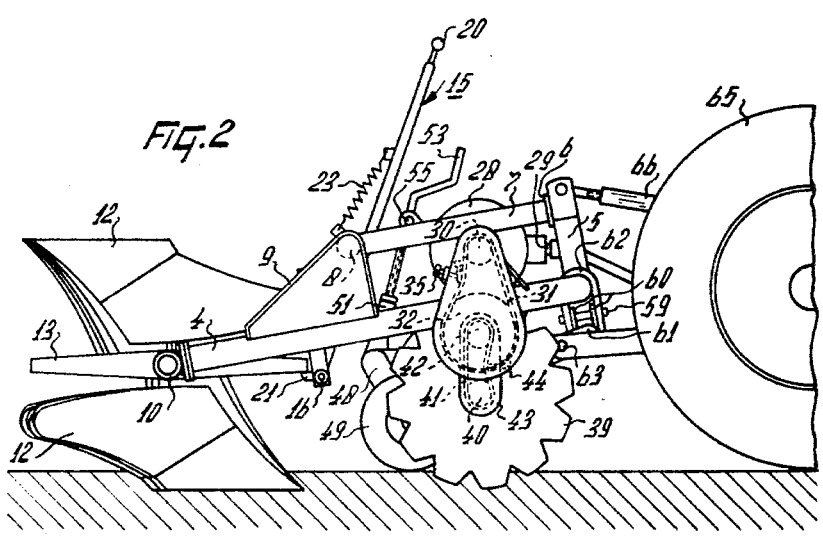

For a better understanding of the invention and to show how the same may be readily carried into effect, reference will be made by way of example to the accompanying drawing, in which FIG. 1 is a plan view of a plow according to the invention, FIG. 2 is a side elevation of the plow according to the invention, FIG. 3 is a front view of a plow according to the invention.

The ground cultivating device shown in the figures is formed by a plow provided with a frame 1 which has a frame beam 2 extending transversely of the direction of travel, which is provided at its ends with frame beams 3 and 4 respectively extending rearwards and parallel to the direction of travel. The length of the frame beams 2 to 4 is such that viewed from above the rigid frame formed by said frame beams is substantially square. Near the center the frame beam 2 is provided with two strips 5 lying at a given distance from each other and extending upwardly towards each other. Near their upper ends the strips 5 are interconnected by a plate 6, to which two beams 7 are secured, which extend to the rear and away from each other, while they are substantially parallel to the beams 3 and 4. The rear ends of the beams 7 are secured to a beam 8, which is secured to the beams 3 and 4 by means of supports 9 and extends parallel to the beam 2. The free ends of the beams 3 and 4 are provided with bearings 10 for accommodating the ends of a beam 11 extending transversely of the direction of travel and parallel to the beams 8 and 2. On the beam 11 there are arranged equidistant plow bodies 12, associated with two groups of three plow bodies each, said groups being offset relatively to each other, viewed from aside, through 180° around the beam 11. For the sake of clarity FIG. 1 does not show the second group of plow bodies.

The plow bodies of one group are arranged on the beam 11 relatively to each other so that, viewed from above, starting from a plow body lying on the outer side, the other plow bodies operative on the same side are located in front of or behind said plow body, viewed in the direction of travel only at a small distance so that the row of plow bodies extends transversely of the direction of travel. The distance between two adjacent plow bodies is in this embodiment such that viewed in the travelling direction, the rear side of the share of one plow body is located behind the tip of the share of the adjacent plow body. This distance is in this case approximately equal to the working width of a plow body. The distance over which the plow bodies are shifted relatively to each other and to the direction of travel is in this case invariably equal to about one tenth of the working width of a plow body. For the two outer plow bodies said distance is equal to twice the distance for the central plow body and an outer plow body. In the longitudinal direction of the beam 11, which extends transversely of the direction of travel, the plow bodies are thus located substantially one behind the other.

From FIG. 2 it will be apparent that the plow bodies 12 of one group extend relatively to those of the other group with their front sides in the opposite direction. Near the ends the beam 11 is provided with arms 13 which are secured to said beam at their centers and which extend in operation horizontally and substantially in the direction of travel. The ends of an arm 13 are adapted to co-operate, in turn, with a tilting mechanism which comprises a bracket 15, extending in upward direction and having its ends journalled in bearings 16 provided on the frame beams 3 and 4. The limbs of the bracket 15 have a part 17, which extends from the end of the bracket parallel to a plane going through the beams 3 and 4 respectively, said part terminating in a part 18, which is bent over in the direction of the longitudinal center line of the device. The portions 18 of the limbs of the bracket 15, thus bent over towards each other, are interconnected by a horizontal part 19. The part 19 is provided with two handles 20, spaced apart from each other. At their free ends the limbs of the bracket 15 are furthermore provided with a stop 21, which is coupled with a spring mechanism 22, not shown in detail and is adapted to co-operate with the respective ends of the arms 13 provided on the beam 11. The parts 17 of the bracket 15 are provided with springs 23, which are connected with the beam 8 and hold the bracket 15 on said beam. Approximately midway between the beam 8 and the beam 2 the upper side of the beam 4 is provided with a support 24, to which a bearing 25 is secured for a shaft 26, which extends parallel to the beams 8 and 2. Near its center said shaft is journalled in a bearing 27, provided on the beam 7 and is provided with a gear wheel (not shown) which co-operates with a gear wheel (not shown) on a shaft 29, journalled between the strips 5, said gear wheels being accommodated in a gear box 28. At the other end the shaft 26 is provided with a pulley 30, which is linked by means of a rope 31 to a larger pulley 32 on a shaft 33. The shaft 33 is located beneath the shaft 26 and extends parallel to the latter and is arranged on the lower side of the beam 4 by means of a bearing. The pulleys 30 and 32 and the rope 31 are surrounded by a screening casing 34, which is provided on the inner side with a rope tightener 35.

Directly beneath the shafts 26 and 33 there is arranged a third shaft 36, which is rotatably arranged in bearings 37 provided on supports 38, secured to the lower sides of the beams 3 and 4. Said shaft is provided with four discs 39, having a diameter of about 50 cms. and being milled at their peripheries. The discs 39 are arranged at such a distance from each other that this distance corresponds substantially with the working width of a plow body (see FIG. 1). From FIG. 1 it will furthermore be apparent that each disc of a plurality of discs 39 is located in front of the tip of the share of a plow body. The shaft 36, on which the discs 39 are seated, is provided with a pulley 40, which is linked by a rope 41 to a pulley 42 on the shaft 33. The diameters of the two pulleys are equal. The two pulleys, together with the rope 41, are surrounded by a screening casing 43, which is provided on the inner side with a rope tightener 44. At equal distances from the center, the beam 2 is provided by means of hinge shafts 45 with arms 46, extending to the rear and being inter-conected at their other ends by means of a transverse beam 47. The latter is provided with equidistant arms 48, extending in downward direction and having ground wheels 49 secured to them.

From FIG. 3 it will be seen that in total three ground wheels are provided. On the upper side of the beam 47 tags 50 are secured, between which a block 51 is arranged, which is adapted to rotate about a horizontal shaft 52. The block 51 is provided with screw thread which is adapted to co-operate with the screw-threaded lower end of a screw spindle 53, which is journalled in a block 54, which is adapted to turn about a horizontal shaft 55, journalled in tags 56, secured to a connecting beam 57, extending transversely of the direction of travel between the beams 7. Between the strips 5, the beam 2 is provided with tags 58 (see FIG. 3), between which there is arranged a shaft 59, which extends in the direction of travel substantially horizontally and which co-operates with bearings in tags 60, secured to a support 61, extending beneath the beam 2 parallel thereto.

On either side of the strips 5 the beam 2 is provided with brackets 62, the limbs of which extend in downward direction and form guides for the support 61. The support 61 can be attached by means of pins 63 to the lowermost arms 64 of the lifting device of a tractor 65. The upper sides of the strips 5, extending towards each other and provided on the beam 2, can be coupled with the upper are 66 of the lift of said tractor. In operation, the shaft 29 arranged between the strips 5 can be coupled with the power take-off shaft of the tractor.

The plow shown in the figures operates as follows.

In operation the discs 39 driven by the power take-off shaft of the tractor make cuts in the ground at a given distance from each other, which distance corresponds to the working width of a plow body located behind them. The strips of soil thus bounded by the cuts are cut loose by means of the share of a plow body and then conducted away sideways by the mould board and turned over. At the end of one run, after the plow has been lifted and the tractor turned, the bracket 15 of the tilting mechanism can be drawn forwardly from the tractor, so that by means of the stop 21 one end of the arms 13 is moved upwardly and the beam 11, supporting the plow bodies, is turned in its bearings 10. After this beam has been turned through substantially 180°, the plow bodies of the upper group have attained their working position and the opposite end of the arm 13 comes into contact with the stop 21. Owing to its resilient connection and a bevelled portion (see FIG. 2) said stop 21 allows this arm to pass by, so that the end of said arm arrives above the stop. Then the plow can again be moved into the working position, in which the stop prevents the beam with the plow bodies from turning back.

The plow according to the invention is a turn wrest plow having a plurality of plow bodies and a plurality of substantially vertical, mechanically driven discs, which are located in front of the plow bodies, seen in the direction of travel. The distance between the rear side of a disc and the foremost point of a plow body is approximately equal to half the diameter of a disc. The shaft 36, supporting the discs is driven by the power take-off shaft so that the discs rotate in the direction of travel, while the speed of rotation is greater than the speed of travel of the plow in operation. It is thus ensured that the propulsion of the plow bodies through the soil requires a considerably lower tractive force from the tractor.

In operation, the frame of the plow, to which the plow bodies and the discs are secured, is adapted to pivot freely about the horizontal shaft 59, extending in the direction of travel and forming the coupling between the beam 2 and the support 61, secured to the lowermost arms of the lift, so that the travel of the plow is independent of the vertical movements of the hindwheels of the tractor in operation.

As stated above, the plow is supported from three ground wheels 49, which are arranged between the plow bodies and the shaft 36, supporting the discs, said wheels lying in one row, viewed from aside. As is shown in the figure, viewed from above, the ground wheels are preferably located in front of the foremost points of the plow bodies. In operation the ground wheels are located substantially inside the circumference of the discs. By means of the screw spindle the height of the ground wheels relative to the frame can be varied and hence also the working depth of the discs and of the plow bodies. The arrangement of the plow bodies, i.e., substantially one behind the other, viewed from aside, permits of constructing the frame of the plow according to the invention so that the assembly can be attached closely behind the tractor, so that in contrast to the known tractor-attached plows, during transport the lift of the tractor is loaded to a considerably lesser extent. Moreover, irregularities in the control of the tractor affect the plow according to the invention to a materially smaller extent.

The presence of the driven discs in front of the plow bodies provides not only the aforesaid reduction of the required tractive force but also such a preparation of the soil to be plowed that the plow bodies can uniformly and easily turn over the strip of soil bounded by the cuts made by the discs. With the plow according to the invention the discs 39 permit of omitting parts for absorbing lateral forces behind the plow bodies, so that the soil to be turned over by the plow bodies is allowed to pass unhindered.

What we claim is:

1. A plow comprising a frame and a plurality of plow bodies, means for supporting said plow bodies on said frame, means for mechanically driving a plurality of discs, one of said discs being mounted on said frame in front of each plow body, said discs being vertically positioned on a common substantially horizontal shaft, said shaft extending transversely of the intended direction of travel of the plow, said frame including a forward frame beam, a support beam located below said forward beam, pivot shaft means extending in the general direction of travel for connecting said forward beam and said support beam, said support beam including means for hitching same to a tractor, whereby said frame is turnable about said shaft means during travel.

2. The invention of claim 1, wherein the plow bodies are offset one behind the other by a distance approximately one-tenth of the working width of one of said plow bodies.

3. The invention of claim 1, wherein said discs are spaced from one another by a distance that approximates the working width of a plow body.

4. The invention of claim 1, wherein the distance between the foremost part of said plow bodies and the rearmost part of said discs is about one half the diameter of a disc.

5. The invention of claim 1, wherein the frame is substantially square when seen in plan view.

6. The invention of claim 5, wherein the discs are mounted within the frame.

7. The invention of claim 1, wherein the plow is supported by three ground wheels rotatably mounted on the frame, the wheels being positioned in front of the plow bodies and to the rear of the discs.

References Cited by the Examiner

UNITED STATES PATENTS

| | | | |
|---|---|---|---|
| 90,799 | 6/1869 | Wilkins | 172—71 |
| 824,014 | 6/1906 | Hayward | 172—71 X |
| 939,132 | 11/1909 | Hubert | 172—205 X |
| 1,032,118 | 7/1912 | Czaran | 172—66 X |
| 1,225,268 | 5/1917 | Paterson | 172—71 |
| 1,539,066 | 5/1925 | Adamy | 172—71 X |
| 1,842,779 | 1/1932 | Graham | 172—205 |
| 2,327,927 | 8/1943 | Orelind | 172—205 |
| 2,834,275 | 5/1958 | Hines | 172—71 X |
| 2,919,143 | 12/1959 | Garner | 172—449 X |

FOREIGN PATENTS 597,224   8/1925   France.

ABRAHAM G. STONE, *Primary Examiner.*

F. B. HENRY, *Assistant Examiner.*